UNITED STATES PATENT OFFICE.

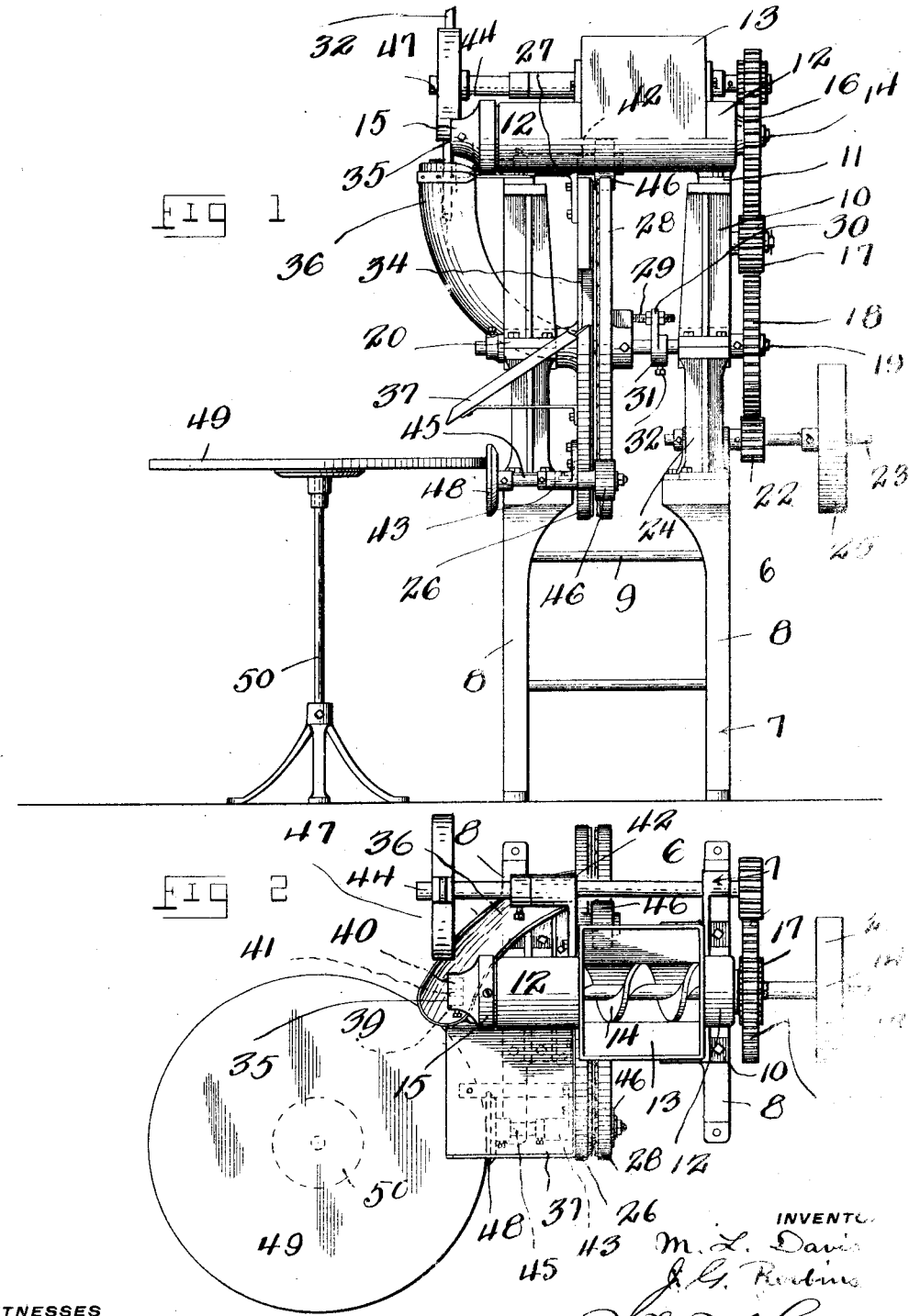

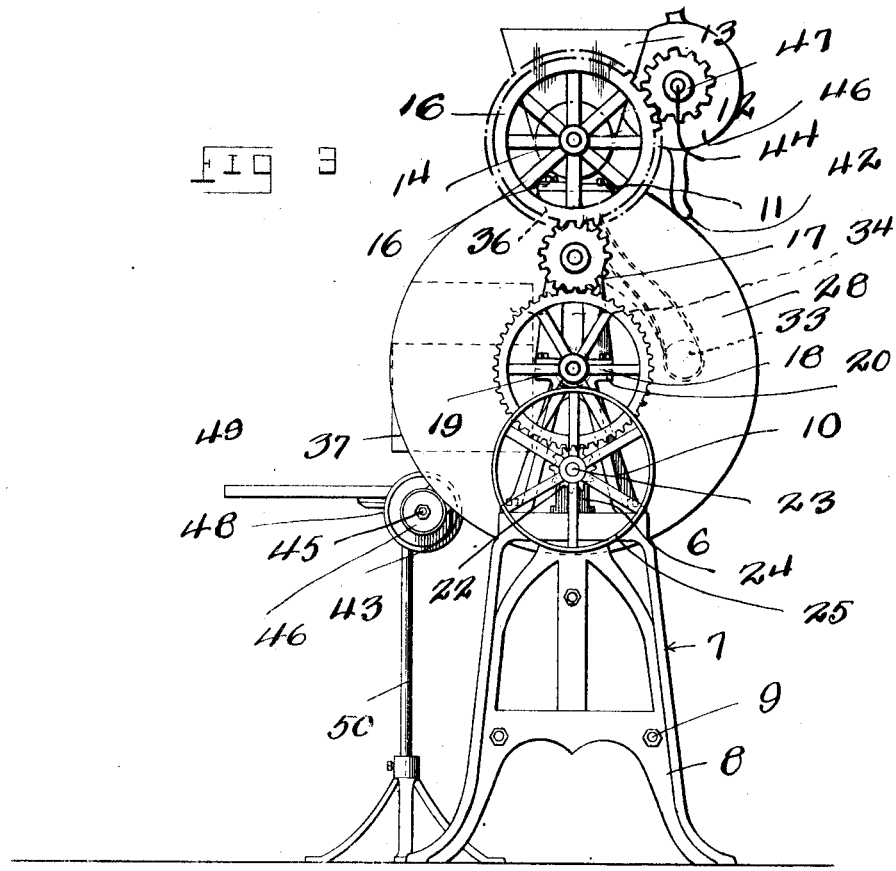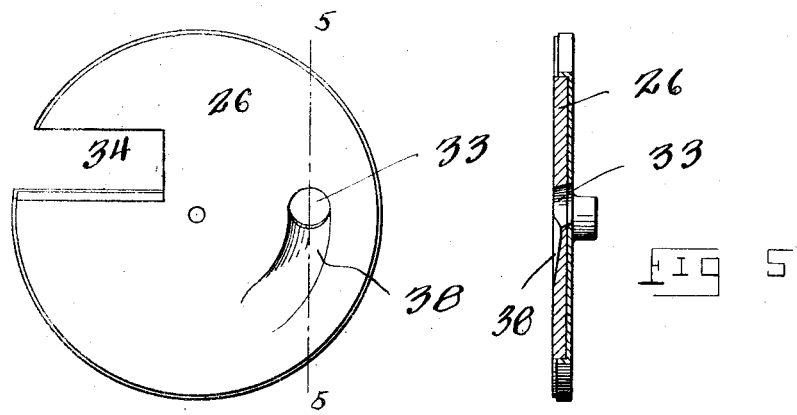

MILES L. DAVIS AND JAMES G. ROBBINS, OF LANCASTER, PENNSYLVANIA, ASSIGNORS OF ONE-HALF TO LORAINE J. SCHUMAKER, OF PHILADELPHIA, PENNSYLVANIA.

PRETZEL CUTTER AND ROLLER.

1,127,967.      Specification of Letters Patent.      Patented Feb. 9, 1915.

Application filed November 30, 1912. Serial No. 734,289.

*To all whom it may concern:*

Be it known that we, MILES L. DAVIS and JAMES G. ROBBINS, citizens of the United States, residing at Lancaster, in the county of Lancaster and State of Pennsylvania, have invented certain new and useful Improvements in Pretzel Cutters and Rollers, of which the following is a specification, reference being had therein to the accompanying drawing.

This invention relates to new and useful improvements in pretzel machines.

An object of this invention is the provision of a machine of this nature in which the dough is automatically fed in proper quantities into mechanism for rolling the same.

Another object of this invention is the provision of a pretzel machine, in which provision is made for conveying quantities of dough from the feeding means to the rolling mechanism.

Still another object of this invention is the employment of a rotary table in connection with a pretzel machine, for conveying the rolled dough within the convenient reach of the operator, and away from the rolling mechanism.

A further object of this invention is the provision of a pretzel machine in which the operating mechanism can be changed to adapt the machine to the making of Vienna bread.

A still further object of this invention is to improve and simplify machines of this character, rendering them comparatively simple and inexpensive to manufacture, reliable and efficient in use, and readily operated.

With the above and other objects in view, this invention resides in the novel features of construction, formation, combination and arrangements of parts to be hereinafter more fully described, claimed, and illustrated in the accompanying drawings, in which:—

Figure 1, is a side elevation of our invention. Fig. 2, is a top plan view thereof. Fig. 3, is an end elevation thereof. Fig. 4, is a face view of one of the disks. Fig. 5, is a transverse sectional view, taken on the line 5—5 of Fig. 4.

Referring to the accompanying drawings by similar characters of reference throughout the several views, the numeral 6, designates generally our improved pretzel machine; which comprises a main frame 7, consisting of supplemental end frames 8, connected and held in spaced relation to each other by longitudinal bars 9.

Bearing brackets 10, are secured to the end frames 8, and have secured to their upper terminals by L-shaped brackets 11, a tubular trough 12, from the central portion of which rises a hopper 13, for the reception of dough. A feed screw 14, is journaled in the trough 12, and has one end disposed within a supporting cap 15; while keyed to the opposite end thereof is a sprocket wheel 16, which is connected by a chain 17, to a sprocket wheel 18, keyed to a shaft 19, journaled in the medial bearings 20, of the bracket 10. A gear wheel 21, is keyed to the shaft 19, and meshes with a drive pinion 22, keyed to a shaft 23, journaled in the lower bearing 24, of one of the brackets 10. This shaft 23, is also equipped with a drive pulley 25, to which power is applied from a suitable source. A stationary disk 26, is secured to the trough 12, by an L-shaped bracket 27, and loosely surrounds the shaft 19; while keyed to this said shaft 19, for coöperation with the disk 26, is a corrugated rotary disk 28, which is adjustable longitudinally of the shaft 19, to and from the disk 26, by a screw 29, which is supported by an arm 30, which extends from the sleeve 31, fixed as at 32, to the said shaft 19.

The disk 26, is formed with openings 33, and 34, the former of which is connected to the open end 35, of the cap 15, by a curved chute 36; while extending outwardly and downwardly from the opening 34, is a discharge trough 37. A groove 38, is formed in the inner face of the disk 26, and leads to the edge of the opening 33, gradually tapering in depth in the opposite direction until vanishing in the inner face thereof. The cap 15, is formed with a relatively large mouth 39, which receives a removable bushing 40, the size of the opening 41, of which regulates the amount of dough fed from the hopper through the trough 12. A pair of bearings 42, and 43, are secured to the disk 26, at its upper and lower edges and support shafts 44, and 45, respectively. Each of these shafts 44, and 45, are provided with frictional pulleys 46, for engagement with the edge of the disk 28, whereby a rotary movement will be imparted to the shafts 44, and 45. A rotary knife 47, is secured to the shaft 44, while a frictional disk 48, is secured to the shaft 45, to engage the edge of a table 49, mounted upon a stand 50, and impart a rotary movement thereto. This table 49, extends beneath the discharge trough 37.

The disks 26, and 28, are formed with cast metal backs 51, into which wooden bodies 52, are inserted. The faces of the wooden bodies are coated with a suitable substance and polished to prevent the dough from soaking into the wood.

While in operation, the dough is fed from the hopper 13 out through the bushing 40, and a certain quantity is cut off by the knife 47, and dropped through the chute 36, into the groove 38, through the opening 33. The rotation of the disk 28, rolls and twists the dough and deposits it into the trough 37, from whence it is deposited upon the rotary table 49, ready for preparation for baking. It should be understood in this connection, that various minor changes in the specific details of construction, can be resorted to within the scope of the appended claims without departing from or sacrificing any of the advantages of the invention.

From the foregoing it will be manifest that a pretzel machine is provided, which will fulfil all of the necessary requirements of such a device.

Having thus fully described this invention, what we claim as new and desire to secure by Letters Patent is:—

1. A machine of the class described, comprising a pair of disks, one of said disks formed with inlet and discharge openings, and the other disk having its inner surface corrugated, said disk being rotatably mounted in relation to the first disk, means for feeding dough between said disks, and means for discharging dough therefrom.

2. In a machine of the class described, the combination with a stationary disk, of a rotatable disk coacting therewith, corrugations formed on said rotatable disk, and said stationary disk provided with a forming groove, and means for adjusting the rotatable disk.

In testimony whereof we affix our signatures in presence of two witnesses.

MILES L. DAVIS.
JAMES G. ROBBINS.

Witnesses:
WM. J. COULTER,
MABEL L. LEFEVRE.